US012481947B2

(12) United States Patent
Lekas et al.

(10) Patent No.: US 12,481,947 B2
(45) Date of Patent: Nov. 25, 2025

(54) SYSTEM AND METHOD FOR DYNAMIC BUSINESS WORKFLOW MONITORING AND REGULATION

(71) Applicant: OpenMethods, Kansas City, MO (US)

(72) Inventors: Shannon Lekas, Cushing, TX (US); Gerrit Voorhis Lydecker, Jr., Los Angeles, CA (US); Carlos Gustavo Colombo, Oceanside, CA (US); Ankur Kanti Patel, Thousand Oaks, CA (US)

(73) Assignee: OPENMETHODS, Kansas City, MO (US)

( * ) Notice: Subject to any disclaimer, the term of this patent is extended or adjusted under 35 U.S.C. 154(b) by 0 days.

(21) Appl. No.: 18/447,274

(22) Filed: Aug. 9, 2023

(65) Prior Publication Data

US 2024/0152840 A1 May 9, 2024

Related U.S. Application Data

(63) Continuation-in-part of application No. 18/072,364, filed on Nov. 30, 2022.

(60) Provisional application No. 63/422,906, filed on Nov. 4, 2022.

(51) Int. Cl.
*G06Q 10/0633* (2023.01)
*G06Q 10/0639* (2023.01)
*H04M 3/51* (2006.01)

(52) U.S. Cl.
CPC ... *G06Q 10/0633* (2013.01); *G06Q 10/06398* (2013.01); *H04M 3/5133* (2013.01); *H04M 3/5175* (2013.01)

(58) Field of Classification Search
CPC ... H04L 63/083; H04L 63/08; H04L 63/0861; H04L 63/10; H04L 63/102; H04L 63/101; G06F 21/31; G06F 21/316; G06F 21/32; G06F 21/36; G06F 3/0481; G06F 3/002; G06F 3/01; G06F 3/04842; G06F 3/0484; G06F 3/048; G06F 3/04817; G06F 40/103
See application file for complete search history.

(56) References Cited

U.S. PATENT DOCUMENTS

| | | | |
|---|---|---|---|
| 10,117,098 B1* | 10/2018 | Naguthanawala | ...... H04L 63/18 |
| 10,127,213 B2* | 11/2018 | Bastide | ................. G06F 40/166 |
| 10,331,502 B1 | 6/2019 | Hart | |
| 10,789,654 B1* | 9/2020 | Eftekhari | ................ H04L 67/02 |
| 2004/0039827 A1* | 2/2004 | Thomas | ................ H04L 67/561 |
| | | | 709/228 |
| 2013/0174050 A1* | 7/2013 | Heinonen | ............... H04L 67/75 |
| | | | 709/217 |
| 2014/0201729 A1 | 7/2014 | Smith et al. | |
| 2014/0282056 A1* | 9/2014 | Godsey | ................. G06F 16/972 |
| | | | 715/744 |

(Continued)

*Primary Examiner* — Tae K Kim
(74) *Attorney, Agent, or Firm* — Galvin Patent Law LLC; Brian R Galvin

(57) ABSTRACT

A system and method for dynamic business workflow monitoring and regulation with third party application integration into browser client application, utilizing a workflow engine configured to monitor a plurality of client application data to detect a workflow event, select an appropriate modal dialog associated with the detected workflow event, and display the selected modal dialog in the browser client application until a workflow engine determines a valid action associated with the displayed modal dialog has occurred.

4 Claims, 9 Drawing Sheets

(56) References Cited

U.S. PATENT DOCUMENTS

| | | | |
|---|---|---|---|
| 2016/0070811 A9* | 3/2016 | Cordasco | G06F 16/9574 715/234 |
| 2017/0012924 A1* | 1/2017 | Freeman | H04L 51/23 |
| 2017/0242567 A1* | 8/2017 | Lefor | G06F 3/0488 |
| 2017/0249393 A1* | 8/2017 | Nair | G06F 16/25 |
| 2018/0217820 A1* | 8/2018 | Conley | G06F 8/30 |
| 2018/0308117 A1* | 10/2018 | Gupta | G06Q 30/0226 |
| 2018/0359233 A1* | 12/2018 | Alexander | H04W 12/062 |
| 2020/0167414 A1* | 5/2020 | Van Rotterdam | G06F 40/174 |
| 2021/0067608 A1* | 3/2021 | Fleck | G06F 11/3452 |
| 2022/0277306 A1* | 9/2022 | Levitt | G06Q 20/4014 |
| 2022/0405658 A1* | 12/2022 | Mitra | G06N 20/00 |

* cited by examiner

SYSTEM AND METHOD FOR DYNAMIC BUSINESS WORKFLOW MONITORING AND REGULATION

CROSS-REFERENCE TO RELATED APPLICATIONS

Priority is claimed in the application data sheet to the following patents or patent applications, each of which is expressly incorporated herein by reference in its entirety:
Ser. No. 18/072,364
63/422,906

BACKGROUND OF THE INVENTION

Field of the Art

The disclosure relates to the field of customer relationship management browser technology, specifically to the field of integrating cloud-based workflow solutions with cloud-based authentication mechanisms.

Discussion of the State of the Art

Business workflows are designed to streamline processes and ensure efficient operations. Each step in a workflow serves a specific purpose and contributes to the overall productivity of the organization. When employees skip or avoid steps, it can disrupt the flow of work, delay progress, and hamper overall efficiency. Business workflows often incorporate checks and balances to maintain quality control, ensure compliance with regulatory requirements or legal obligations that must be followed, and contribute to consistency and standardization. Further, workflows are not static; they evolve based on feedback and insights gained from the execution of tasks. Skipping steps can prevent the organization from identifying areas of improvement and implementing necessary changes. Some of the existing client-side applications like customer relationship browser clients do not have a method to prevent workers from avoiding steps in a business workflow. There is a need for the capability to intercept agent workarounds and direct the agent to the intended action or process.

What is needed is a system and method for dynamic business workflow monitoring and regulation which prevents enterprise employees from skipping or dismissing critical business workflow steps.

SUMMARY OF THE INVENTION

Accordingly, the inventor has conceived and reduced to practice, a system and method for dynamic business workflow monitoring and regulation with third party application integration into browser client application, utilizing a workflow engine configured to monitor a plurality of client application data to detect a workflow event, select an appropriate modal dialog associated with the detected workflow event, and display the selected modal dialog in the browser client application until a workflow engine determines a valid action associated with the displayed modal dialog has occurred.

According to a preferred embodiment, a system for dynamic business workflow monitoring and regulation is disclosed, comprising: the workflow engine comprising at least a first plurality of programming instructions stored in a memory of, and operating on at least one processor of, a computing device, wherein the first plurality of programming instructions, when operating on the at least one processor, causes the computing device to: receive a plurality of browser based application data; analyze the plurality of browser based application data to detect a modal event; select a modal dialog associated with the detected modal event; display the modal dialog in a browser based application user interface; receive, responsive to the displayed modal dialog, user action data; determine if the action corresponding to the action data is valid or invalid; and wherein the modal dialog is repeatedly displayed until the action data is determined to be valid.

According to another preferred embodiment, a method dynamic business workflow monitoring and regulation is disclosed, comprising the steps of: receiving a plurality of browser based application data; analyzing the plurality of browser based application data to detect a modal event; selecting a modal dialog associated with the detected modal event; displaying the modal dialog in a browser based application user interface; receiving, responsive to the displayed modal dialog, user action data; determining if the action corresponding to the action data is valid or invalid; and wherein the modal dialog is repeatedly displayed until the action data is determined to be valid.

According to an aspect of an embodiment, the browser based application is customer relationship management system.

According to an aspect of an embodiment, the modal event is associated with a skipped or dismissed business workflow step.

According to an aspect of an embodiment, the workflow engine is further configured to: retrieve one or more enterprise-specific formatting rules from a database; and format the selected modal dialog based on the one or more enterprise-specific formatting rules.

BRIEF DESCRIPTION OF THE DRAWING FIGURES

The accompanying drawings illustrate several aspects and, together with the description, serve to explain the principles of the invention according to the aspects. It will be appreciated by one skilled in the art that the particular arrangements illustrated in the drawings are merely exemplary, and are not to be considered as limiting of the scope of the invention or the claims herein in any way.

DETAILED DESCRIPTION OF THE INVENTION

Figure 1:
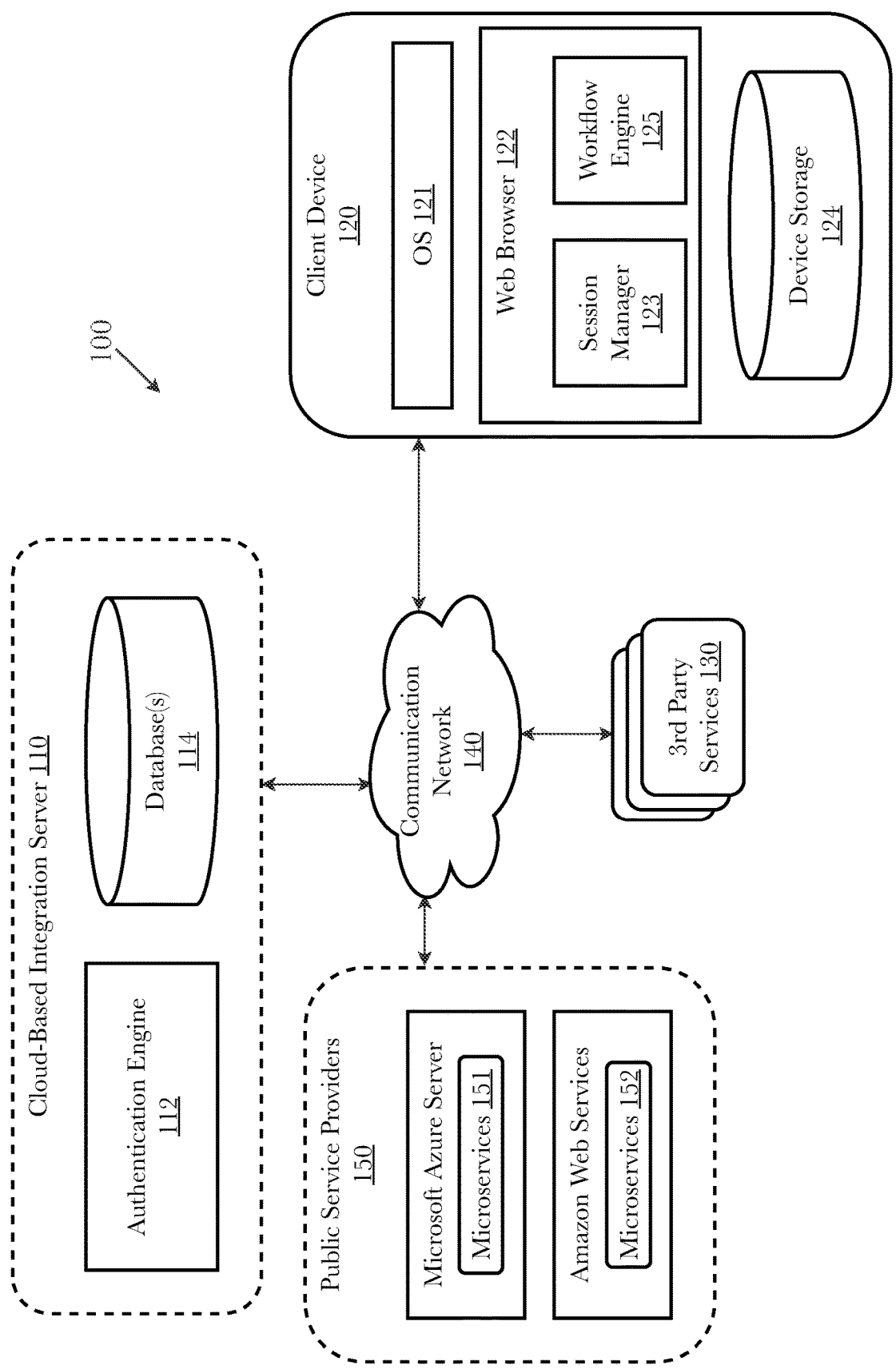
FIG. 1 is a block diagram illustrating an exemplary system architecture for third party service integration into a browser client application, according to one embodiment.

The inventor has conceived, and reduced to practice, a system and method for dynamic business workflow monitoring and regulation with third party application integration into browser client application, utilizing a workflow engine configured to monitor a plurality of client application data to detect a workflow event, select an appropriate modal dialog associated with the detected workflow event, and display the selected modal dialog in the browser client application until a workflow engine determines a valid action associated with the displayed modal dialog has occurred.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

Definitions

"Modal dialog" or sometimes referred to herein as "Modal dialog box", "Modal dialog popup", and "Modal dialog window" refers to a dialog that appears on top of the main content and moves the system into a special mode requiring user interaction. This dialog disables the main content until the user explicitly interacts with the modal dialog. In contrast, nonmodal (or modeless) dialogs and windows do not disable the main content: showing the dialog box doesn't change the functionality of the user interface. The user can continue interacting with the main content (and perhaps even move the window, minimize, etc.) while the dialog is open.

Conceptual Architecture

FIG. 1 is a block diagram illustrating an exemplary system architecture 100 for third party service integration into a browser client application, according to one embodiment. According to the embodiment, the system 100 comprises a cloud-based integration server 110, one or more client device 120, a plurality of public cloud-based service providers 150 such as, for example, MICROSOFT AZURE® and AMAZON WEB SERVICES®, a plurality of 3rd party services 130 such as private service providers, and a communication network 140 which allows one or more of these components (and other components not shown) to be communicatively coupled to facilitate bi-directional data exchange over a suitable communication network such as, for example, the Internet or a cellular telephone network.

According to the embodiment, client device 120 comprises an operating system 121, a web browser 122 application, and device storage 124 such as a memory and/or non-volatile storage device (e.g., hard drive, solid state drive, etc.). Examples of client devices include, but are not limited to, personal computers, laptops, tablet computers, smart phones, smart wearables, personal digital assistants, and/or the like. Also present on client device 120 but not shown in the drawing is at least one processor operating on client device 120, the at least one processor configured to read, process, and execute a plurality of machine readable instructions which cause the client device to perform at least some of the functions and processes described herein. Operating within the web browser 122 of client device 120 is a session manager 123 and a workflow engine 125 which both provide support for third party service integration directly into web browser 122. According to various implementations, session manager 123 is configured to monitor and store session state information associated with the client device 120 user's current (e.g., ongoing) session with a browser based application such as, for example, a customer relationship management ("CRM") system. According to an aspect, session state information may comprise session variables such as (non-limiting) session login time (e.g., time at which the user first logged into the CRM system), client device identification or identifiers (e.g., MAC address, IMEI number, ESN number, etc.), and user identification or identifiers (e.g., username, password, email address, group, privileges, etc.). In some implementations, session manager 123 may also store a client session token associated with client device 120 and received from authentication engine 112 responsive to a client session login request. When a client session login request is generated within the browser 122, the session state information may be retrieved by session manager 123 and sent to workflow engine 125 which sends the client session state data to cloud-based integration server 110.

According to the embodiment, workflow engine 125 is present to support third party service integration into the browser based application (e.g., browser-based CRM system) and configured to process browser based service requests originating from inside the browser user interface (e.g., CRM system user interface). When a service request is made, workflow engine retrieves a client session token from session manager 123 and creates a wrapper token. In some implementations, the wrapper token comprises the client session token and any appropriate service request data which was received as part of the service request. Workflow engine 125 can send the wrapper token to authentication engine 112 for third party service integration. As an example, a client clicks on an interactive button for a service (e.g., service request) within the browser 122 UI, which causes an API call in the browser 122, wherein workflow engine 125 captures this API call and includes it in the wrapper token which is then sent to cloud-based integration server 110 wherein the service request may be fulfilled. Upon fulfillment of the request, the workflow engine 112 may receive one or more third party service data objects (e.g., JSON, etc.) from an authentication engine 112 stored and operating within the cloud-based integration server 110 and then display the one or more data objects within the user interface of the browser 122.

According to the embodiment, cloud-based integration server 110 may comprise an authentication engine 112 operating on a cloud device 110 that authenticate an user (i.e., client) and presents a service integration token (or authentication identifier token) for integration through the operating system and software applications (i.e., web browser 122) on the client device 120, wherein interacting with the service integration token produces third party data objects to be used to execute customer relationship management ("CRM") client workflows incorporating client application, context, and trust information. Cloud-based integration server 110 may comprise one or more computing devices, each of the one or more computing devices comprising at least one processor and a memory. In some implementations, cloud-based integration server 110 may be a distributed architecture wherein the components and functionality of the system may be distributed across two or more computing devices at a given location (e.g., a data center) or distributed across two or more computing devices at different geographic locations (e.g., two data centers).

According to the embodiment, authentication engine 112 can be configured to receive client session login requests or data from a browser based application operating on the client device 120. For example, a client may be a contact center agent and the browser based application may be a CRM system. In some implementation, the client session login request or data may comprise information related to the specific client device from which the request/data originated from, session details (e.g., session state) associated with the client's current session within the browser based application (e.g., CRM system), and client information including, but not limited to, username, password, group, privileges, and/or the like. When authentication engine 112 receives a client session login request/data it may store the received data in a database 114. In some implementations, the stored data may be used to validate users (e.g., clients) associated with a received service request. Once the client session login data has been stored, authentication engine 112 may create and transmit a client session token to a session manager 123 operating within the web browser 122 of the client device 120. The client session token represents that the user of the client device has successfully logged into the cloud-based integration server 110 and can be used to authenticate the user during subsequent service requests from client device 120. In some implementations, the client session token may comprise session state information such as, for example, device ID, session ID, and user/client ID information.

According to the embodiment, authentication engine 112 is further configured to receive a wrapper token from workflow engine 125. A client may submit a service request (such as, for example, via pressing on an interactive element of the browser UI) which is intercepted by workflow engine 125 and passed as a wrapper token to authentication engine 112. Authentication engine 112 can parse the wrapper token to retrieve the session information embedded into the session token. Authentication engine 112 can validate the user by comparing the parsed session information to stored session information in database 124. If the user cannot be validated, then the service request is terminated and, in some implementations, an error message may be displayed to the user via the browser 122 interface on the client device. If the user can be validated because the session information matches stored information in database 124, then authentication engine 112 may generate an authentication identifier token. In various implementations, the authentication identifier token may be logically linked to the wrapper token. In some aspects, authentication identifier token may comprise service request information and credentials. Authentication engine 112 can send the authentication identifier token to the third party service 150, 130 and/or third party microservice 151, 152 associated with the service request. Authentication engine 112 receives back from the third party service a payload (e.g., whatever data was necessary to fulfill service request) in the form of one or more third party data objects (e.g., JSON files, XML files, etc.) which may or may not be encrypted, and sends the payload to workflow engine 112 which causes the third party data objects to be displayed in the browser 122 user interface.

Figure 2:
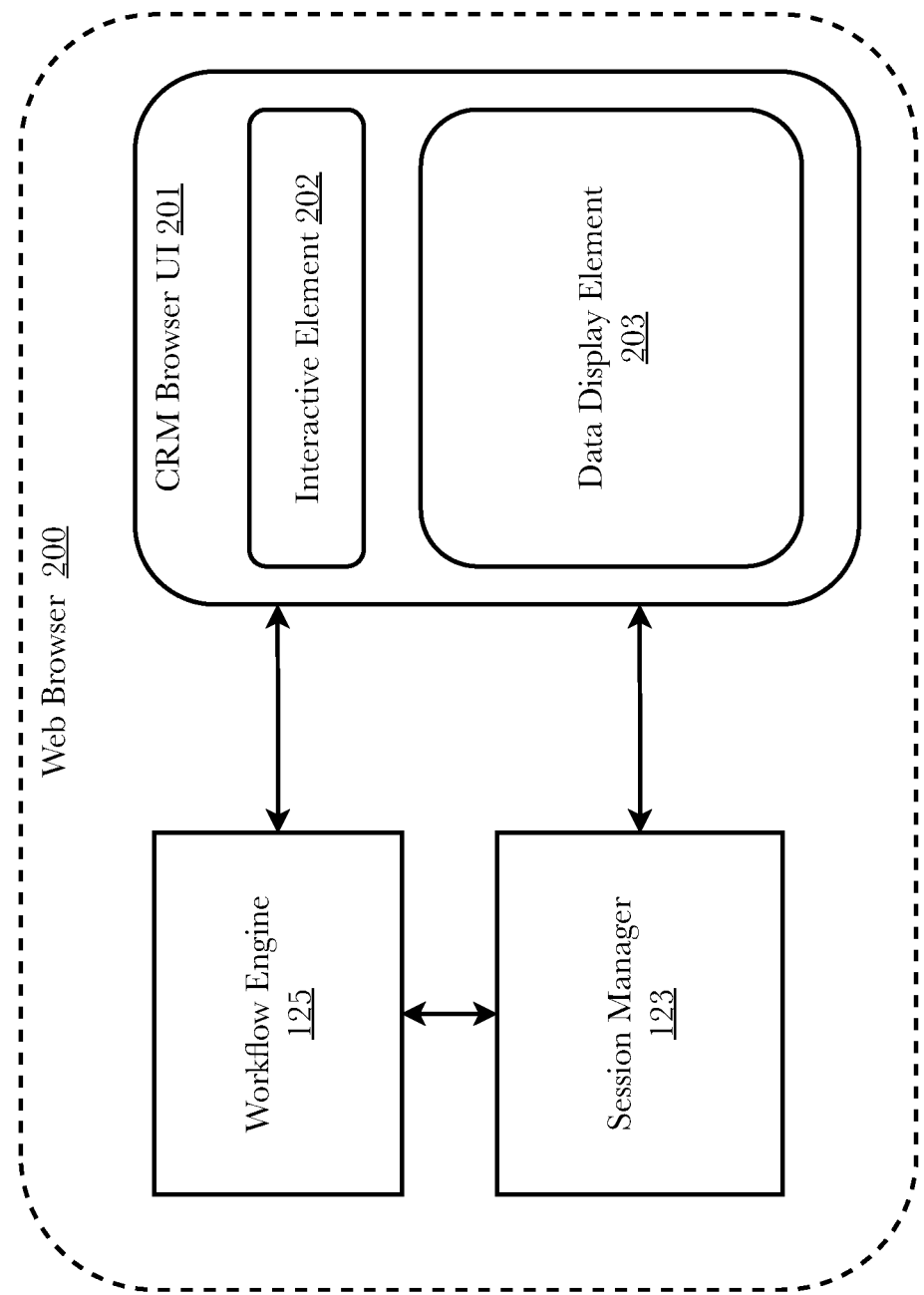
FIG. 2 is a block diagram illustrating an exemplary web browser utilizing third party service integration, according to an embodiment.

FIG. 2 is a block diagram illustrating an exemplary web browser 200 utilizing third party service integration, according to an embodiment. A web browser 200 may be operating on a client device 120 and may be any appropriate web browser application known those skilled in the art such as, for example, Internet Explorer, Google Chrome, Apple Safari, Mozilla Firefox, etc. Operating within the web browser 200 are components of the third party service integration system, a workflow engine 125 and session manager 123. A user of the client device 120 can use web browser 200 to access a browser-based application such as a browser-based CRM system which displays in the web browser a CRM browser interface 201. Browser interface 201 may further comprise a plurality of interactive elements 202 such as (the non-limiting) buttons, links, dropdown menus, file browsers, and/or the like, and a plurality of data display elements 203 which provide space within the browser UI 201 for data to be viewed and managed. Session manager 123 can be configured to capture and store session state variables related to a user's current session with the CRM system including, but not limited to, device identifier data, user data, and session data (e.g., login time, length of session, etc.). Session manager 123 can also be configured to store a client session token received from authentication engine 112 responsive to a client session login request from CRM browser UI 201 (or workflow engine 125) to cloud-based integration server 110. When a client session login request is made session manager 123 may send session state information to authentication engine 112 either directly or via workflow engine 125 depending on the implementation. In return, session manager 123 (or workflow manager 125) receives a client session token which logs in and authenticates the user with cloud-based integration server 110 and helps facilitate third party service integration into the CRM browser UI 201.

In operation, a user of client device 120 may submit a service request by interacting with an interactive element 202 of the CRM browser UI 201. For example, within the CRM bowser UI 201 there is displayed a button that says get order tracking information which, when clicked upon by the CRM user (e.g., contact center agent) generates a service request for an order tracking service provided by a third party service provider 150, 130. The service request may be intercepted or obtained by workflow engine 112 which combines the service request information with the client session token stored in session manager 123 to form a wrapper token which is sent to authentication engine 112. As an example, clicking on interactive element 202 such as a button may generate a service request in the form of an application programming interface ("API") call, wherein the API call may comprise various service request information (e.g., service address, requested data, client data and metadata, etc.). Authentication engine 112 parses the received wrapper token to first validate the user wherein, upon successful user validation, the service request is passed to the third party service as part of an authentication identifier token. Authentication engine 112 receives back from the third party service the payload (e.g., order tracking information) which may be in the form of one or more various types of data objects. The payload may be sent to workflow engine 125 which can display the third party data objects in a data display element 203 of the CRM browser UI 201.

In this way authentication engine 112 can provide improved security for the client and client device 120 by facilitating data exchange between and a plurality of public and private $3^{rd}$ party services and/or microservices whereby the user does not have to directly send their credentials to the plurality of third party services thus reducing the risk of malicious cyberattacks such as man in the middle and other such network packet capturing/monitoring attack vectors. Additionally, workflow engine 125 and session manager 123 provide authentication and third party service and/or microservice integration functions wherein third party data objects may be used to execute various user defined workflows all while operating within the web browser 200 of a client device.

In some implementations, the workflow engine 125 is able to display more than one payload on the CRM browser UI 201 utilizing one or more display elements 203.

Figure 6:
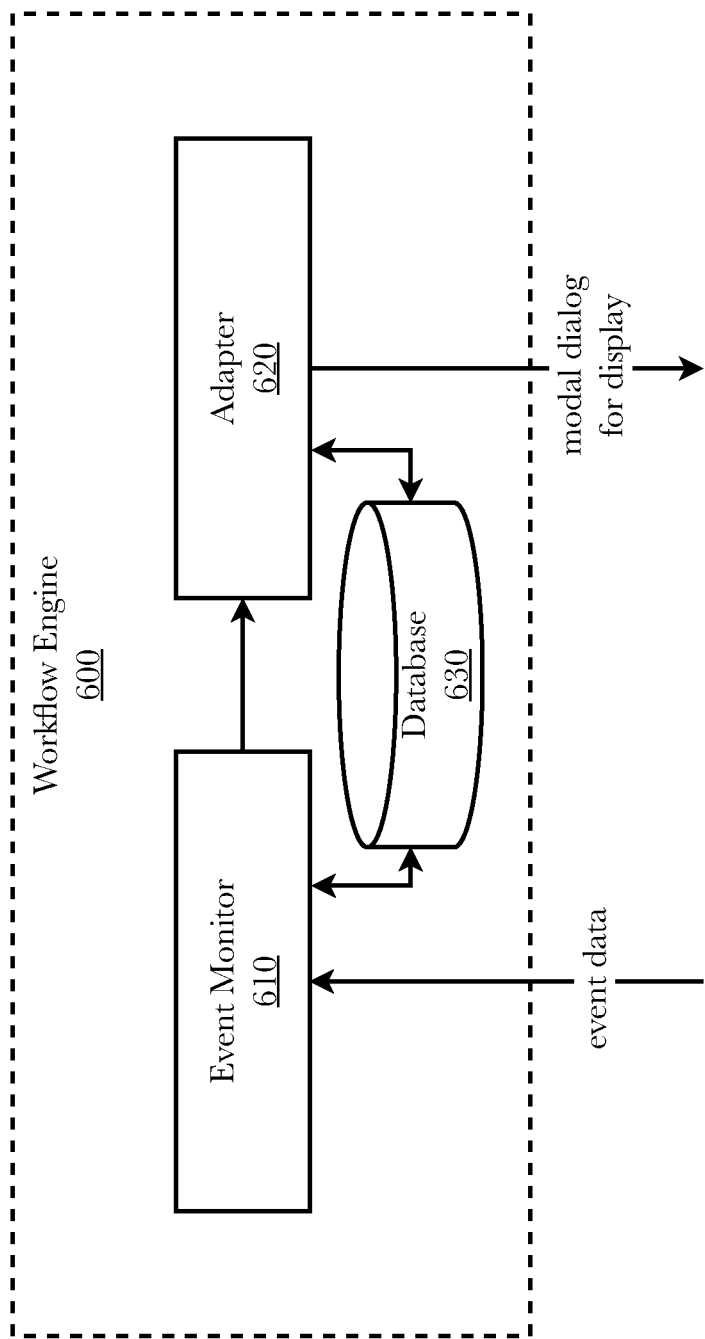
FIG. 6 is a block diagram illustrating an exemplary aspect of an embodiment of a workflow engine configured to provide a browser client application (e.g., CRM system) dynamic workflow monitoring and regulation.

FIG. 6 is a block diagram illustrating an exemplary aspect of an embodiment of a workflow engine configured to provide a browser client application (e.g., CRM system) dynamic workflow monitoring and regulation. According to the embodiment, workflow engine 600 is configured to provide dynamic monitoring and regulation of a browser client application user workflow to improve user productivity and ensure compliance with business or other standards. System 100 can provide a "single pane of glass" wherein various interactive and display elements may be seamlessly and securely overlayed on a client browser application such as, for example, a CRM. The features provided by the aspect illustrated in FIG. 6 allows the integrated system 100 to detect and generate for display an identical dialog box that is part of the "single pane of glass" overlay, thus allowing enterprise users to fix a problem that is present if certain large enterprise software suites without having to get the suite vendor to recode their product.

According to the aspect, workflow engine 600 comprises an event monitor 610 which may be configured to receive, retrieve, or otherwise obtain various CRM application process data and user behavior to monitor the steps in a business workflow. In some embodiments, a database 630 may be present and configured to store a plurality of business rules and/or workflows which can be used to compare against received application data to determine when a business workflow step has been skipped or otherwise omitted by the CRM application user (e.g., agent, customer service representative, etc.). Event monitor 630 may analyze the plurality of received data to detect an event. Data associated with the event may be captured by event monitor 630 and used to determine the type of modal dialog box should be displayed within the CRM browser U 201. In some implementations, event monitor 630 can access a plurality of event data and associated modal dialog data such that each event may have an associated one or more modal dialogs, wherein event monitor 630 selects a modal dialog based on its analysis of the captured event data.

According to the aspect, a selected modal dialog may be sent to an adapter 620 which formats the selected modal dialog for display within the CRM application UI. Adapter 620 may access database 630 to retrieve formatting rules for modal dialogs, wherein the formatting rules may be specific to an enterprise software suite. For example, a SALES-FORCE™ CRM may follow different formatting (e.g., font size and type, window size and location on screen, etc.) requirements than that of a ZENDESK™ CRM. The displayed modal dialog may be represented as a box or pop-up window. The modal dialog may comprise a call-to-action or some other requirement that needs to be satisfied in order for the agent's normal workflow to continue. Once the modal dialog has been displayed, event monitor 610 continues to provide real-time monitoring of the agent's action taken responsive to the displayed modal dialog. If the agent's action is valid, that is, it satisfies the call-to-action or other requirement, then the agent may continue on with their workflow. If the agent's action is invalid (e.g., manually dismissing the modal dialog, etc.), then workflow engine 600 can repeatedly display the modal dialog until a valid action is determined to occur.

Detailed Description of Exemplary Aspects

Figure 3:
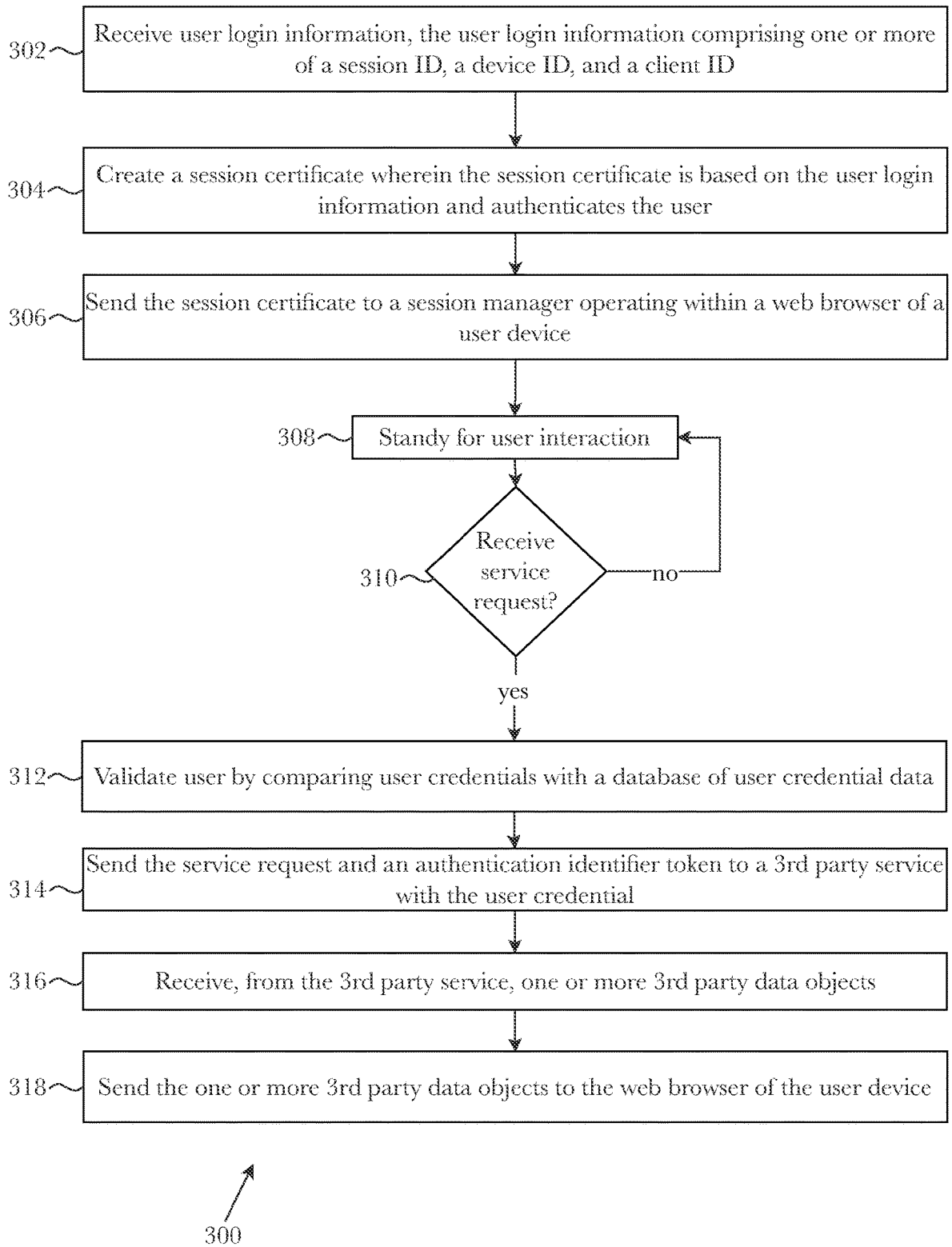
FIG. 3 is a flow diagram illustrating an exemplary method for providing client authentication and third party integration, according to an embodiment.

FIG. 3 is a flow diagram illustrating an exemplary method 300 for providing client authentication and third-party service integration, according to an embodiment. According to the embodiment, the process begins at 302 when authentication server 112 (or some other component of cloud-based integration server 110) receives user login information from a browser based component of system 100 such as workflow engine 125 and/or session manager 123 of a client device 120. The user login information may comprises one or more of a session ID, a device ID, and a client ID (e.g., username and/or password). Some or all of the user login information may be used to compare against stored data in a database 114 to determine if the user has logged in before. Some or all of the user login information may be stored in database 114 such as in a user profile associated with the user who submitted the user login information. Once received, the user of client device 120 is logged into system 100. At 304 authentication engine 112 can create a session certificate (e.g., token) which provides user authentication for transacting with cloud-based integration server 110 and third party service integration functions. In some implementations, the session certificate may comprise or be derived from all or a subset of user login information. Authentication manager 112 can 306 send the session certificate to the client device browser where it can be captured by session manager 123 operating within the web browser of the client device 120. At 308 authentication engine 112 may operate in standby, waiting to receive more user login information from another user or for a service request or wrapper token at 310 from workflow manager 125 operating within the web browser of the client device 120. If no service request is received at 310, then authentication engine 112 remains in standby mode. If a service request is received, then at 312 authentication engine 112 may parse a received wrapper token to extract the session certificate and then use the session certificate to validate the user credentials by comparing the extracted certificate against stored data in database 114. Upon successful user validation, authentication engine 112 can create an authentication identifier or token which grants the client access to the third party service by signaling that the client has privileges to access the third party service. In some implementations, the authentication identifier or token is only good for the single service request associated with it. At 314 authentication engine 112 can send the service request and the authentication identifier token to the third party service which is associated with the service request. At 316 authentication engine 112 can receive back from the third party service one or more data objects which can then be sent to workflow engine 125 operating within the web browser of the client device 120 at 318 for display in a browser based CRM UI.

Figure 4:
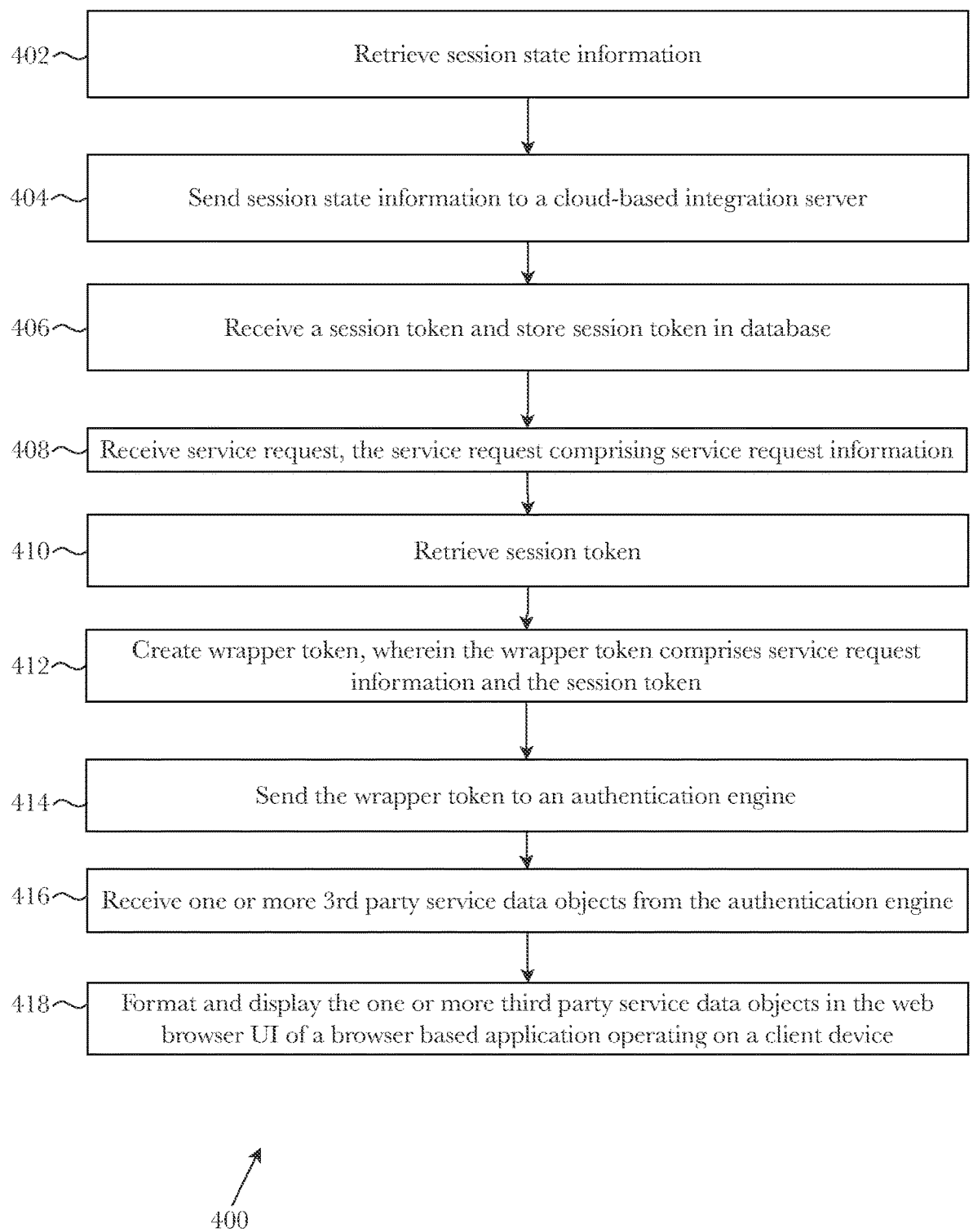
FIG. 4 is a flow diagram illustrating an exemplary method for providing client authentication and third party service integration utilizing one or more browser-based system components, according to an embodiment.

FIG. 4 is a flow diagram illustrating an exemplary method 400 for providing client authentication and third party service integration utilizing one or more browser-based system components, according to an embodiment. According to the embodiment, the process begins at 402 when a user of a client device submits user login information to cloud-based integration server 110 and workflow engine 112 retrieves session state information (e.g., data related to the user's current session within a browser based application such as, for example, a browser based CRM system) from session manager 123. At 404 this session state information may be sent to cloud-based integration server 110 where it may be processed by one of its components such as authentication engine 112. Workflow manager 125 can receive back from authentication engine 112 a session token and send the session token to session manager 123 for storage at 406. At this stage of the process workflow engine 125 operates in standby mode, ready to communicate with cloud-based integration server 110 or to process a service request, while session manager 123 monitors the current session state and updates session variables as necessary. At 408, responsive to a user clicking an interactive element 202 of the browser UI 201 thereby generating a service request, workflow engine 125 can receive the service request, which can comprise a plurality of service request information and retrieve the users session token from session manager 123 at 410. At 412 workflow engine 125 creates a wrapper token, wherein the wrapper token comprises service request information and the retrieved service token. The wrapper token is sent to authentication engine 112 at step 414 wherein the authentication engine can use the embedded session token to validate the user before distributing the service request to the appropriate third party service and/or microservice endpoint. At 416 workflow engine 125 can receive one or more third party service data objects from authentication engine 112 responsive to the service request. As a last step 418, workflow engine 125 may format and otherwise prepare the one or more third party service data objects for display in the web browser UI 201 of a browser based application operating on a client device 120.

Figure 5:
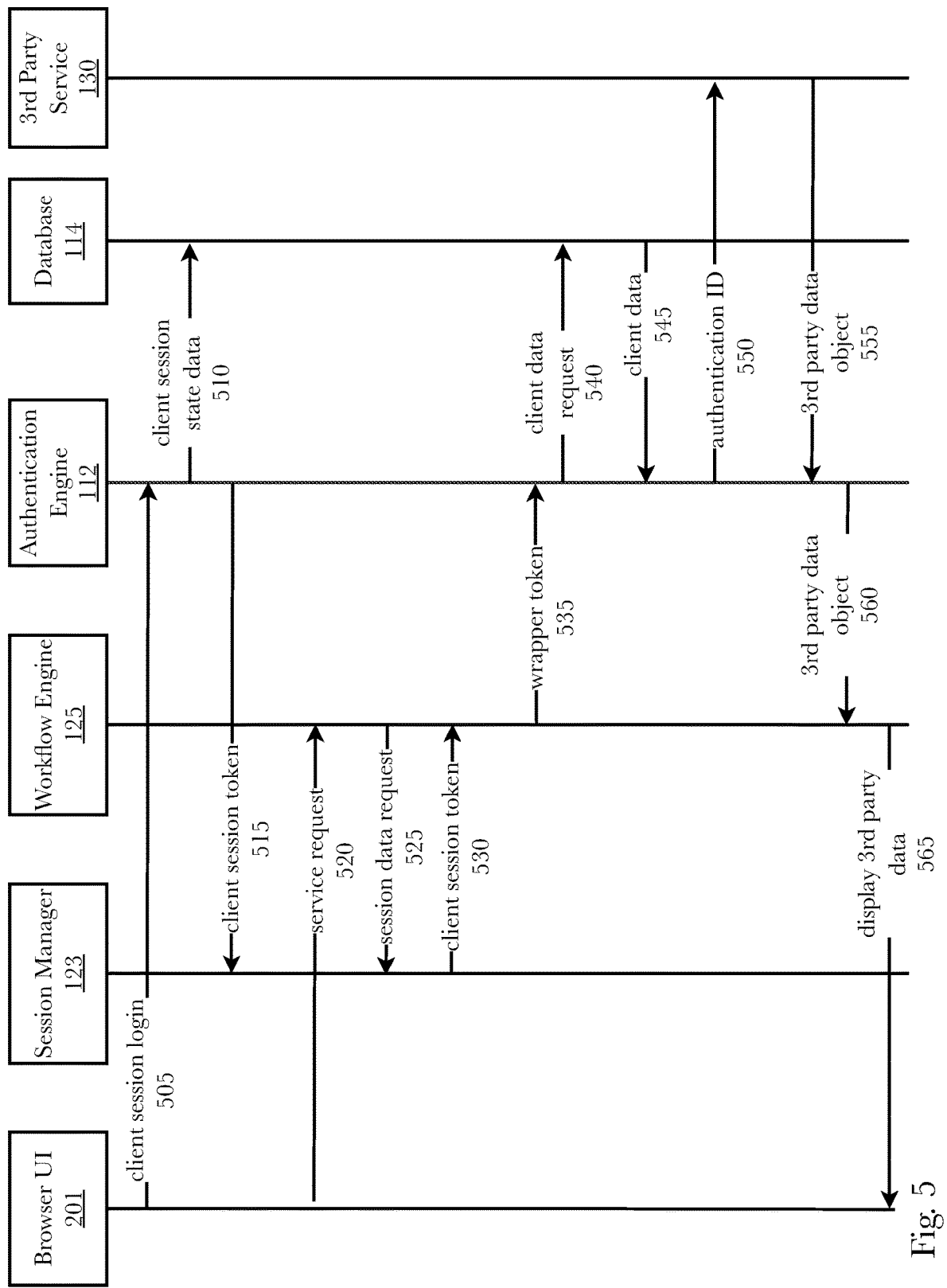
FIG. 5 is a message flow diagram illustrating an exemplary data message exchange between various components of the third party service integration system, according to an embodiment.

FIG. 5 is a message flow diagram illustrating an exemplary data message exchange between various components of the third party service integration system, according to an embodiment. According to the embodiment, the third party service integration system comprises a cloud-based authentication engine 112 and database 114, a plurality of third party services 130 (and/or 150) and/or microservices, and a client (i.e., user) device which has a web browser application user interface 201 and operating within the browser at least a session manager 123 and a workflow engine 125. A client may begin a session with browser-based CRM system by logging into said system with his or her login credentials (e.g., username and password). Session manager 123 may be configured to monitor and record client session state variables associated with the client's current browser-bases CRM system session. In some implementations, session state variables can include a session login time, a session ID (e.g., unique or semi-unique identifier associated with only the current session), etc.), and client login credentials such as a username and/or password. From the browser UI 201 the client (i.e., user) can log into cloud-based integration server 110 by sending a client session login request 505 to authentication engine 112. Authentication engine 112 sends user session state data and/or user data 510 to database 114 for storage and in turn sends a client session token 515 back to the browser UI 201 which is stored in session manager 123. In some implementations, workflow engine 125 may receive the client session token and send it to session manager 123 for storage. Workflow engine 125 is operating on standby within the browser of client device 120 waiting to receive a service request 520 from the browser UI 201. In some implementations, a client can submit a service request by clicking on an interactive element within the browser UI such as a button. Workflow engine 125 sends a request 525 to session manager 123 for the session data via the client session token which session manager sends back 530 to workflow engine 125. Workflow engine creates a wrapper token comprising at least the service request information and the session token and then transmits this wrapper token 535 to authentication engine 112. Authentication engine 112 performs a quick user validation check 540 by comparing session token with stored data 545 in database 114. Once a user has been validated, authentication engine 112 creates an authentication identifier token and transmits 550 it to the appropriate third party service 130, 150. The third party service 130 can process the service request and send back one or more of the requested third party data objects 555 to authentication engine 112 which can then transmit 560 the third party data to the appropriate client device 120 via workflow engine 125 which receives the one or more third party data objects from authentication engine 112. Workflow engine 125 can format and display the third party data 565 in a browser based CRM system UI 201 wherein a client (e.g., contact center agent, customer service representative, etc.) may construct, test, and execute workflows with the browser UI 201 using the third party data.

According to the embodiment, a workflow engine 125 is stored and operating on a client device (e.g., PC, laptop, smart phone, tablet, smart wearable, etc.) and configured to integrate a plurality of $3^{rd}$ party software applications into a browser-based CRM system, wherein the integration of third party services allows the client (i.e., contact center agent, customer service representative, etc.) to create bespoke workflows using third party service data which instantiate and execute within the browser-based CRM system all while improving network security by removing the direct exchange of personal identifying information ("PII") between the client device and the various services and by reducing the required amount of different server connections (and therefore reducing the amount of potential opportunities for malicious cyberattacks on data in transit).

Figure 7:
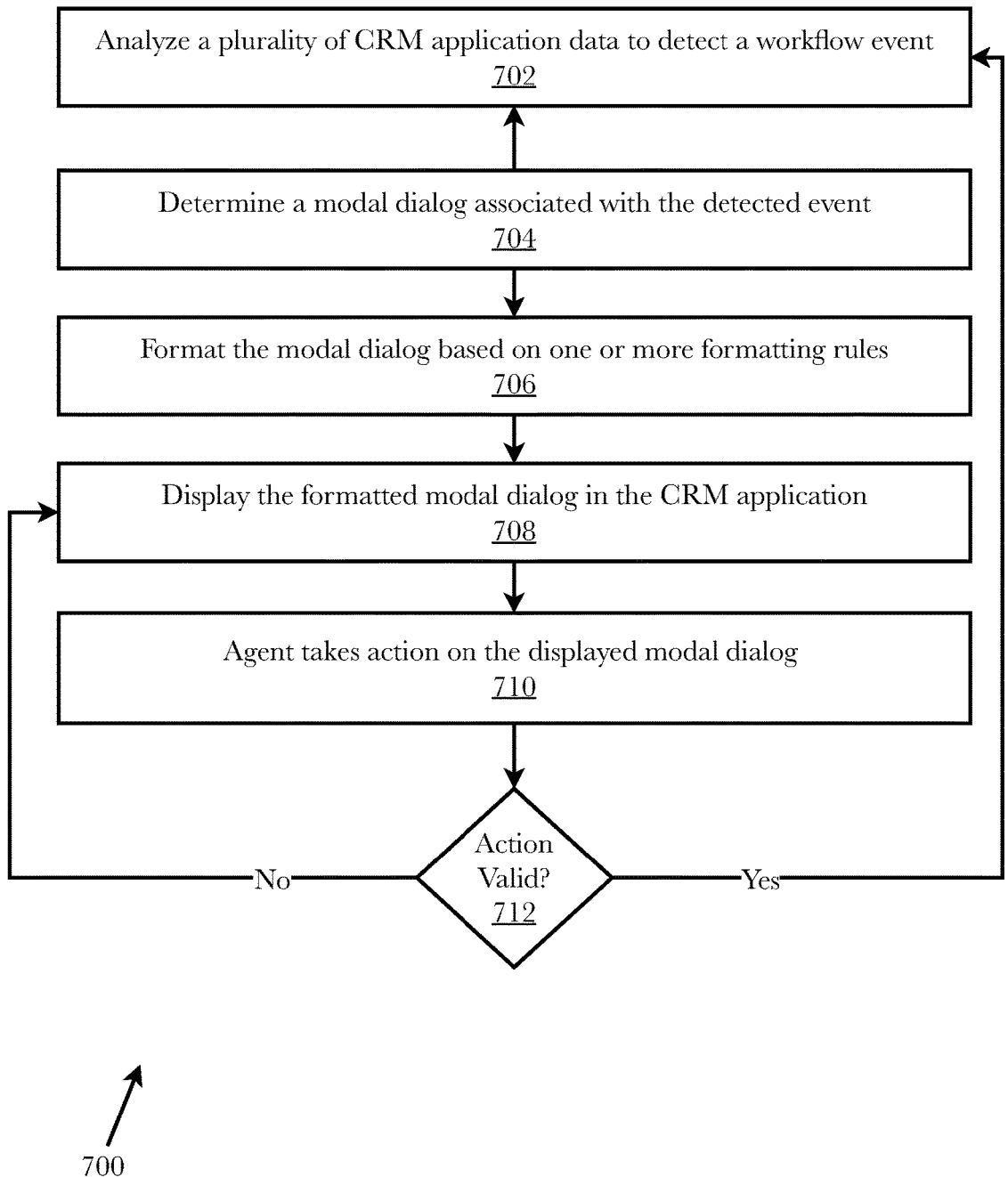
FIG. 7 is a flow diagram illustrating an exemplary method for dynamically monitoring and regulating business workflow processes, according to an embodiment.

FIG. 7 is a flow diagram illustrating an exemplary method 700 for dynamically monitoring and regulating business workflow processes, according to an embodiment. According to the embodiment, the method involves workflow engine 600 to receive a plurality of CRM application data and user behavior data. At step 702 event monitor 610 analyzes the plurality of CRM application data and user behavior data to detect a workflow event. A business workflow may comprise one or more steps which an enterprise has applied to be followed with respect to a specific process or outcome. For example, a business workflow for an agent representing an enterprise may be the creation of a new customer account wherein the agent gathers customer information (e.g., directly from the customer or via other sources) and populates customer profile with the gathered information. Continuing the example, a business workflow rule may be that all new customer contact information (e.g., phone number, address, email address, etc.) must be gathered and entered into the CRM before other customer information such as demographic information and/or services/products associated with the customer. Some CRM products do not prevent agents from avoiding steps in the business workflow, and workflow engine 600 can detect when an event such as a skipped or dismissed step in a business workflow occurs and regulate the action of the agent to remedy the skipped or dismissed step.

At step 704 event monitor 610 determines a modal dialog associated with the detected event. In some implementations, a database 630 may be used to compare against stored events wherein each event may have a modal dialog associated with it. The selected modal dialog may be sent to an adapter 620 at step 706 which formats the modal dialog based on one or more formatting rules which may be retrieved from database 630. Workflow engine 600 may then display the formatted modal dialog in the web-based CRM application at step 708. At step 710 an agent takes an action on the displayed modal dialog. At this point event monitor 610 receives application data associated with the action that was just taken by the agent and analyzes the action data to determine if the action was valid at step 712. A valid action is an action which directly addresses and corresponds to the displayed modal dialog. For example, a modal dialog may appear that asks and requires the system user to select one option from multiple displayed options and a valid action would correspond to the agent selecting one of the options. An invalid action, therefore, is any action which does not address or otherwise satisfy the parameters of the modal dialog. For example, if an agent manually dismisses the modal dialog by clicking the CRM backdrop or a dismissal button, then event monitor could capture this application data, analyze the dismissal event data, and then determine that the manual dismissal is a form of invalid action. If at step 712 the action is determined to be invalid, then workflow engine 600 goes back to step 708 and repeats the process until the agent performs a valid action i.e., performing the instructed step as disclosed in the modal dialog. If, instead at step 712 the action is determined to be valid, then workflow engine 600 goes back to step 702 and continues to provide real-time monitoring of application data and user behavior data to detect business workflow events and regulate agent compliance with enterprise-specific best practices and standards.

Figure 8:
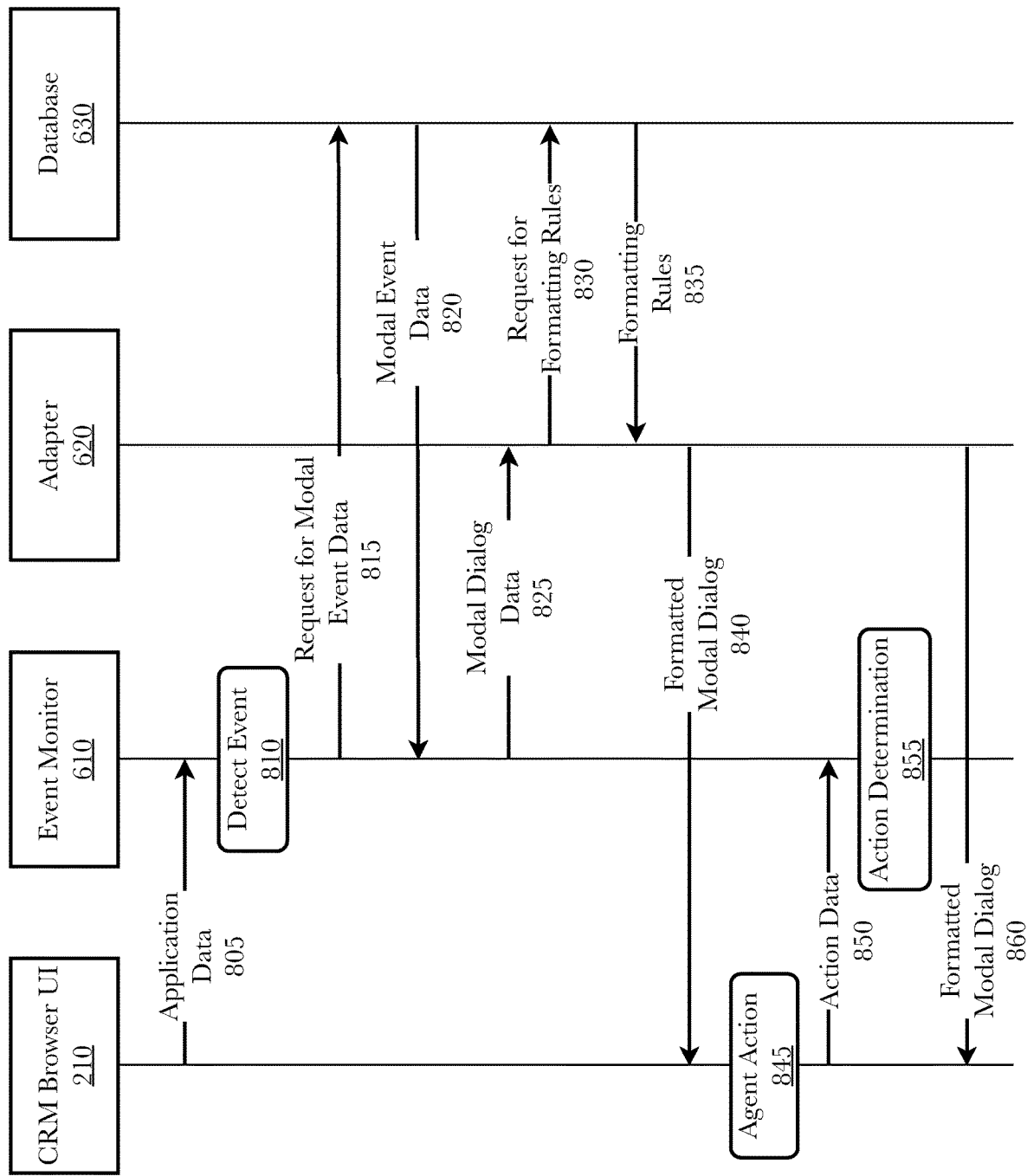
FIG. 8 is a block diagram illustrating exemplary message passing between components of a system for dynamic business workflow monitoring and regulation, according to an embodiment.

FIG. 8 is a block diagram illustrating exemplary message passing between components of a system for dynamic business workflow monitoring and regulation, according to an embodiment. According to the embodiment, the system comprises at least a browser-based application such as a CRM browser UI 210 and a workflow engine 600 comprising an event monitor 610, an adapter 620, and a database 630. In a preferred embodiment, during operation event monitor 610 receives a plurality of application data 805 and user behavior data from the web-based application, for example, CRM browser UI 210. Event monitor 610 may analyze this plurality of information to detect a business workflow event 810. Once an event has been detected, event monitor 610 may request modal event data 815 from database 630. Database 630 may send the requested modal event data 820 to event monitor 610. Event monitor 610 may use the received modal event data to select a modal dialog for display in the CRM browser UI 210 responsive to the detection of the event. Event monitor 610 can send the selected modal dialog 825 to adapter 620. Adapter 620 may request enterprise-specific formatting rules 830 from database 630. Database 630 may send the requested formatting rules 835 to adapter 620. Adapter 620 may format the selected modal dialog based on the received formatting rules. The formatted modal dialog may be sent 840 to CRM browser UI 210 for display so that an agent may be informed on a skipped or missed step in a business workflow. The displayed modal dialog can have some sort of message or call-to-action associated with it that requires the agent to perform some step or action in order to maintain cohesion with the prescribed business workflow. An agent may perform some action 845 in response to the display of the formatted modal dialog. Event monitor 610 can capture the action data 850 associated with the agent action and determine whether the agent action was valid or invalid 855. Valid actions require no more intervention from the system and the system can continue to provide real-time monitoring for business workflow events. In the case when an invalid action occurs, adapter 620 will cause the formatted modal dialog to display again 860 in CRM browser UI 210 until a valid agent action is detected.

Exemplary Computing Environment

Figure 9:
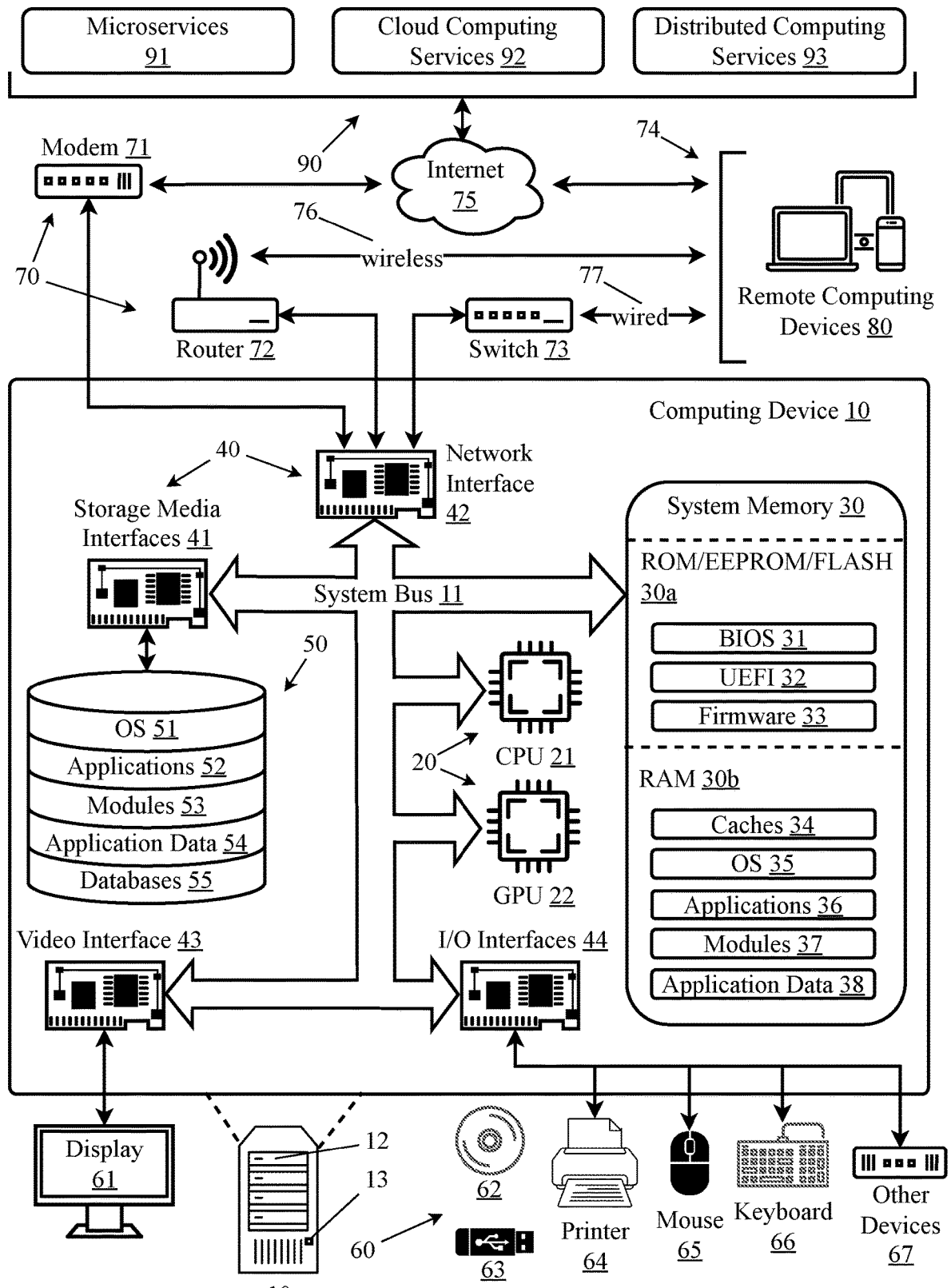
FIG. 9 illustrates an exemplary computing environment on which an embodiment described herein may be implemented, in full or in part.

FIG. 9 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between, those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions. Further, computing device 10 may comprise one or more specialized processors such as a graphics processing unit (GPU) 22 configured to accelerate processing of computer graphics and images via a large array of specialized processing cores arranged in parallel.

System memory 30 is processor-accessible data storage in the form of volatile and/or nonvolatile memory. System memory 30 may be either or both of two types: non-volatile memory and volatile memory. Non-volatile memory 30a is not erased when power to the memory is removed, and includes memory types such as read only memory (ROM), electronically-erasable programmable memory (EEPROM), and rewritable solid state memory (commonly known as "flash memory"). Non-volatile memory 30a is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30a may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30b is erased when power to the memory is removed and is typically used for short-term storage of data for processing. Volatile memory 30b includes memory types such as random access memory (RAM), and is normally the primary operating memory into which the operating system 35, applications 36, program modules 37, and application data 38 are loaded for execution by processors 20. Volatile memory 30b is generally faster than non-volatile memory 30a due to its electrical characteristics and is directly accessible to processors 20 for processing of instructions and data storage and retrieval. Volatile memory 30b may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, and graph databases.

Applications (also known as computer software or software applications) are sets of programming instructions designed to perform specific tasks or provide specific functionality on a computer or other computing devices. Applications are typically written in high-level programming languages such as C++, Java, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, main frame computers, network nodes, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP or message queues. Microservices 91 can be combined to perform more complex processing tasks.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over the Internet on a subscription basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

What is claimed is:

1. A system for preventing customer relationship management (CRM) application users from skipping required steps of a CRM workflow for an enterprise, comprising:
a customer relationship management (CRM) workflow engine comprising at least a first plurality of programming instructions stored in a memory of, and operating on at least one processor of, a computing device, wherein the first plurality of programming instructions, when operating on the at least one processor, causes the computing device to:
receive a plurality of application data from a user of a third-party browser-based CRM application, the user associated with the enterprise;
analyze the plurality of third-party browser-based CRM application data to detect a modal event associated with the CRM workflow;
select a modal dialog associated with the detected modal event;
detect a skippable dialog box associated with the modal event displayed by the third-party browser-based CRM application;
retrieve one or more enterprise-specific formatting rules from a database, the one or more enterprise-specific formatting rules comprising formatting rules for the detected skippable dialog box;
format the selected modal dialog based on the one or more enterprise-specific formatting rules to be identical to the detected skippable dialog box;
display the modal dialog overlayed on the detected skippable dialog box such that a user cannot interact with the skippable dialog box;
receive, responsive to the displayed modal dialog, action data from the user;
determine if the action data is valid or invalid for the CRM workflow; and
wherein the modal dialog is repeatedly displayed until the action data is determined to be valid for the CRM workflow.

2. The system of claim 1, wherein the modal event is associated with a skipped or dismissed CRM workflow step.

3. A method for preventing customer relationship management (CRM) application users from skipping required steps of a CRM workflow for an enterprise, comprising the steps of:
receiving, by a CRM workflow engine, a plurality of application data from a user of a third-party browser-based CRM application, the user associated with the enterprise;
analyzing, by a CRM workflow engine, the plurality of third-party browser-based application data to detect a modal event associated with the CRM workflow;
selecting a modal dialog associated with the detected modal event;
detecting, by a CRM workflow engine, a skippable dialog box associated with the modal event displayed by the third-party browser-based CRM application;
retrieving one or more enterprise-specific formatting rules from a database, the one or more enterprise-specific formatting rules comprising formatting rules for the detected skippable dialog box;
formatting the selected modal dialog based on the one or more enterprise-specific formatting rules to be identical to the detected skippable dialog box;
displaying, by a CRM workflow engine, the modal dialog overlayed on the skippable detected dialog box such that the user cannot interact with the skippable dialog box;
receiving, responsive to the displayed modal dialog, user action data from the user;
determining, by a CRM workflow engine, if the action data is valid or invalid for the CRM workflow; and
wherein the modal dialog is repeatedly displayed until the action data is determined to be valid for the CRM workflow.

4. The method of claim 3, wherein the modal event is associated with a skipped or dismissed CRM workflow step.

* * * * *